United States Patent [19]
Ozeki

[11] Patent Number: 4,836,667
[45] Date of Patent: Jun. 6, 1989

[54] MICROSCOPE

[75] Inventor: Jiro Ozeki, Tokyo, Japan

[73] Assignee: Slidex Corporation, Tokyo, Japan

[21] Appl. No.: 45,584

[22] Filed: May 4, 1987

Related U.S. Application Data

[63] Continuation-in-part of Ser. No. 860,023, May 6, 1986, abandoned.

[30] Foreign Application Priority Data

Apr. 9, 1987 [JP] Japan .................................. 62-85636

[51] Int. Cl.$^4$ ............................................ G02B 21/26
[52] U.S. Cl. ...................................... 350/531; 350/529; 350/534; 350/536
[58] Field of Search ............................ 350/524–536, 350/523, 238, 241; 353/27 R, 120, DIG. 3, 22–24, 27 A

[56] References Cited

U.S. PATENT DOCUMENTS

| | | | |
|---|---|---|---|
| 1,615,216 | 1/1927 | Cruger | 350/531 |
| 2,003,387 | 6/1935 | Ott | 350/530 |
| 2,847,901 | 8/1958 | Sassaman et al. | 353/27 R |
| 3,352,201 | 11/1967 | Brownscombe | 88/24 |
| 3,421,814 | 1/1969 | Burnham | 353/23 |
| 3,645,611 | 2/1972 | Smith | 353/23 |
| 3,687,520 | 8/1972 | Nothnagle et al. | 350/523 |
| 3,738,730 | 6/1973 | Binnings et al. | 350/529 |
| 3,807,850 | 4/1974 | Ozeki | 353/23 |
| 3,822,090 | 7/1974 | Mak et al. | 353/27 |
| 3,824,009 | 7/1974 | Spaleny et al. | 353/27 |
| 3,869,201 | 3/1975 | Lysle | 353/27 R |
| 4,133,605 | 1/1979 | Wiggin | 353/27 R |
| 4,184,754 | 1/1980 | Ozeki | 353/27 |
| 4,299,440 | 11/1981 | Hodgson | 350/530 |
| 4,328,713 | 5/1982 | Lund | 74/479 |
| 4,338,006 | 7/1982 | Ozeki | 353/85 |
| 4,453,807 | 6/1984 | Faulkner | 350/534 |
| 4,579,431 | 4/1986 | Ansel et al. | 353/27 R |

FOREIGN PATENT DOCUMENTS

| | | |
|---|---|---|
| 2116813 | 10/1972 | Fed. Rep. of Germany . |
| 57-161847 | 10/1982 | Japan . |
| 2027927 | 2/1980 | United Kingdom ................ 350/534 |

Primary Examiner—Bruce Y. Arnold
Assistant Examiner—Märtin Lerner
Attorney, Agent, or Firm—Fleit, Jacobson, Cohn, Price, Homan & Stern

[57] ABSTRACT

A microscope including a base frame, a stage provided on or over the base frame, and a file page placed on the stage and adapted for supporting a plurality of samples. An arm extends from the base frame up to a place over the stage. A magnifying optical system has an optical axis directed in a direction orthogonal to the stage, and an illuminating optical system is provided on the axis of the magnifying optical system at a place spaced from the stage.

15 Claims, 16 Drawing Sheets

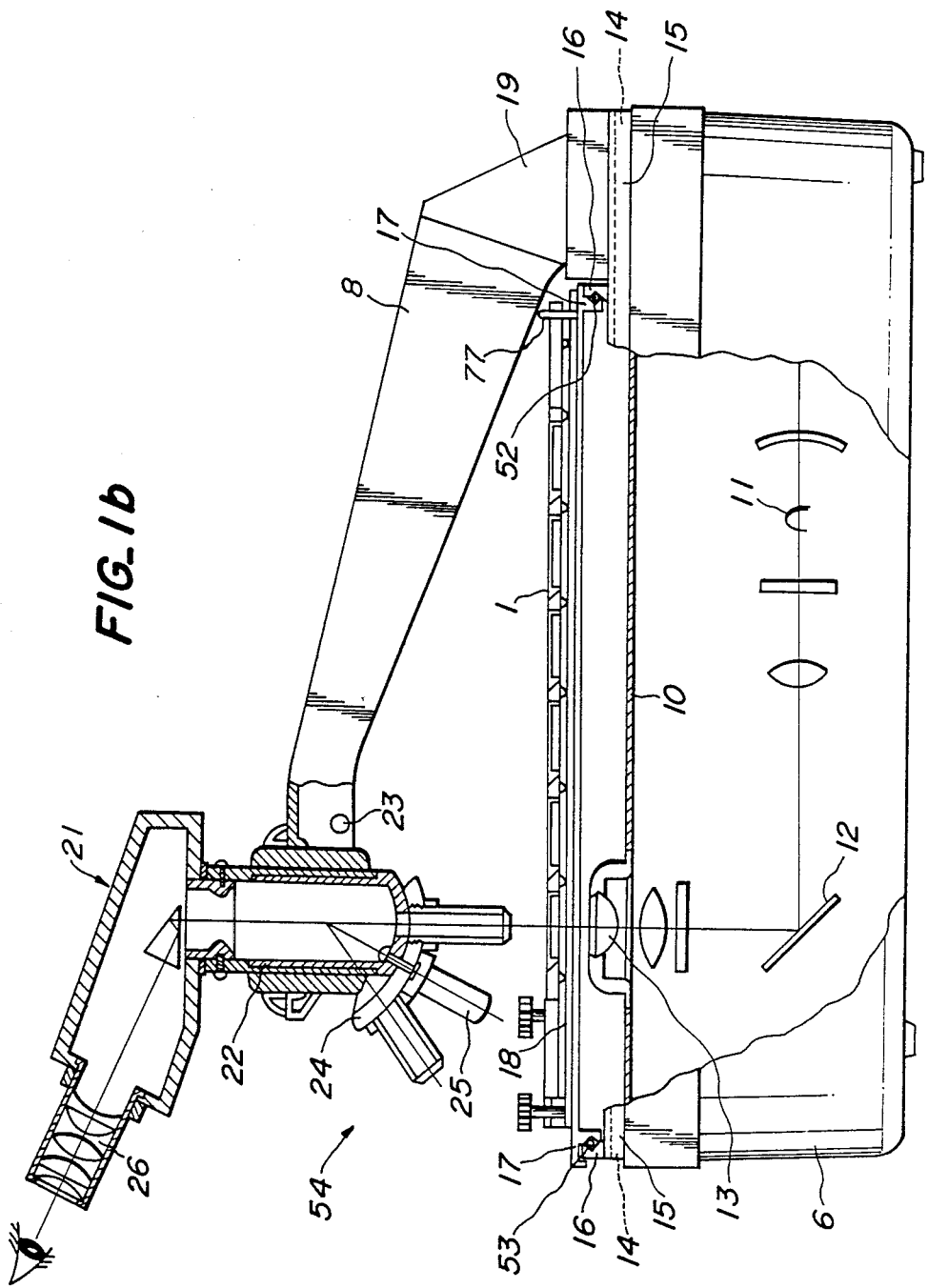
FIG._1b

FIG_2a
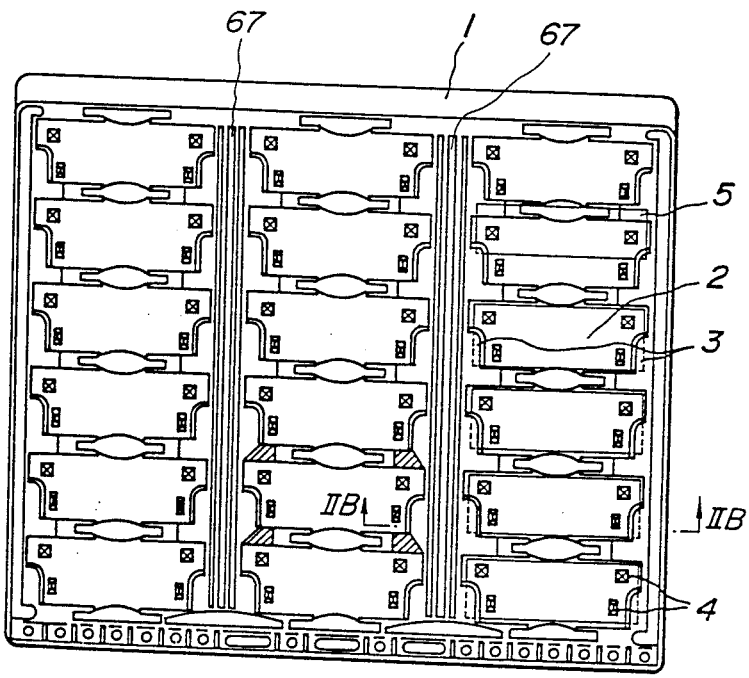
FIG_2b
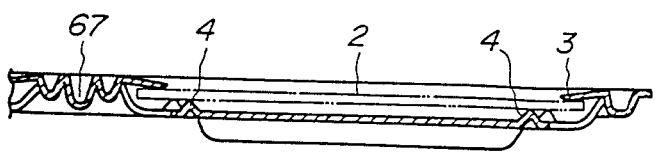

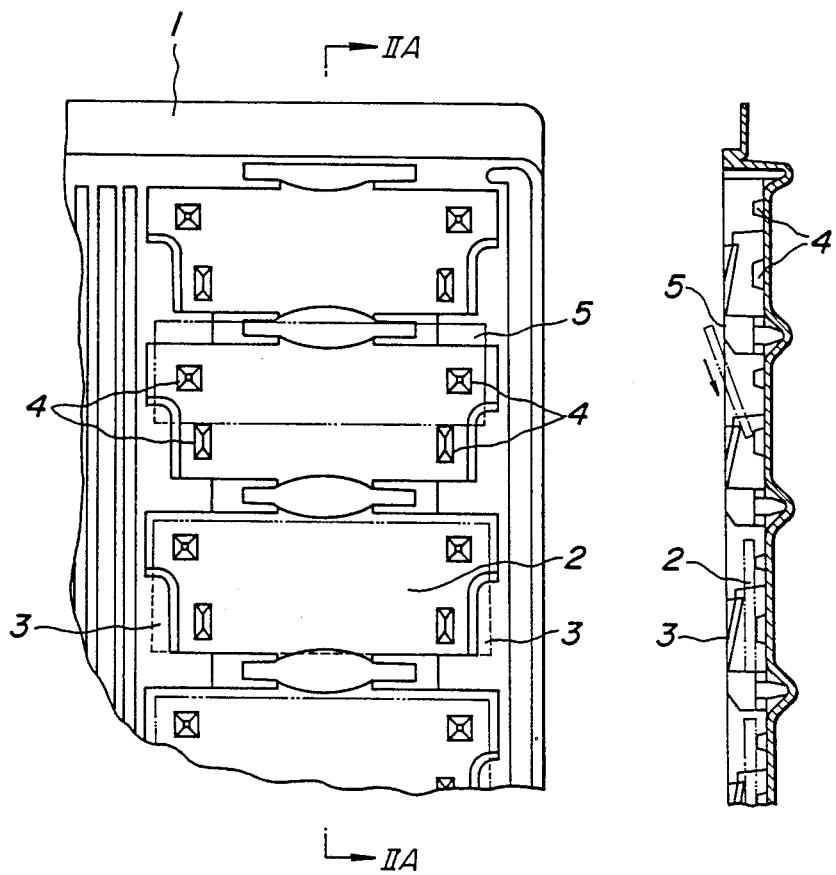

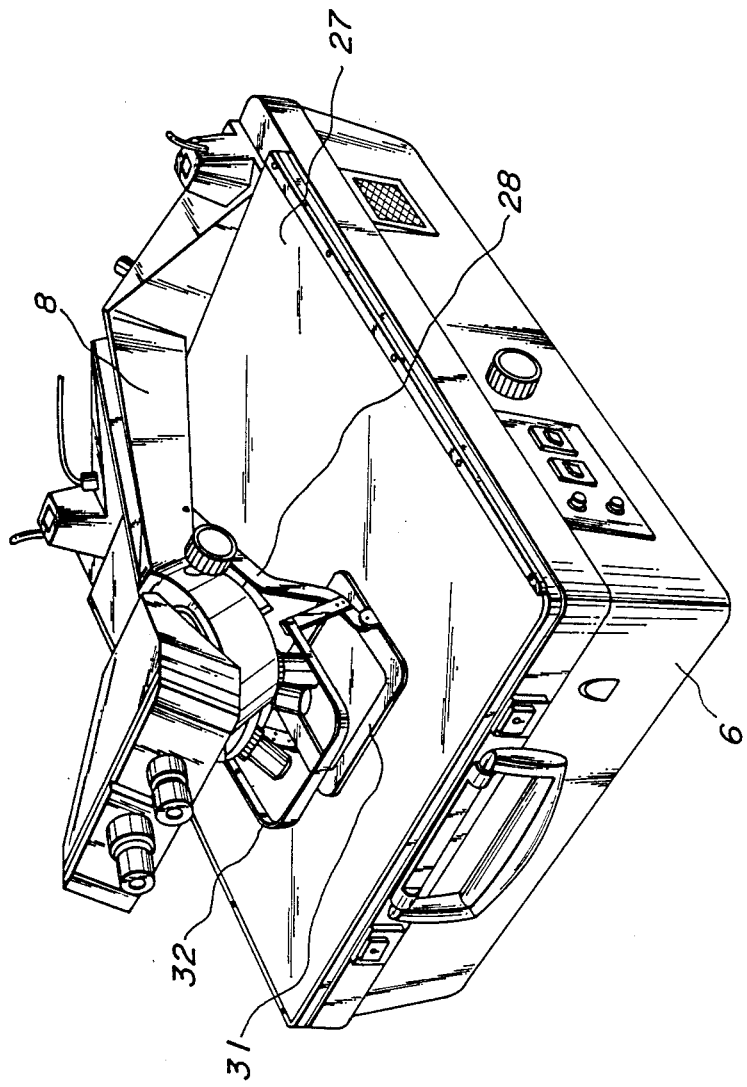

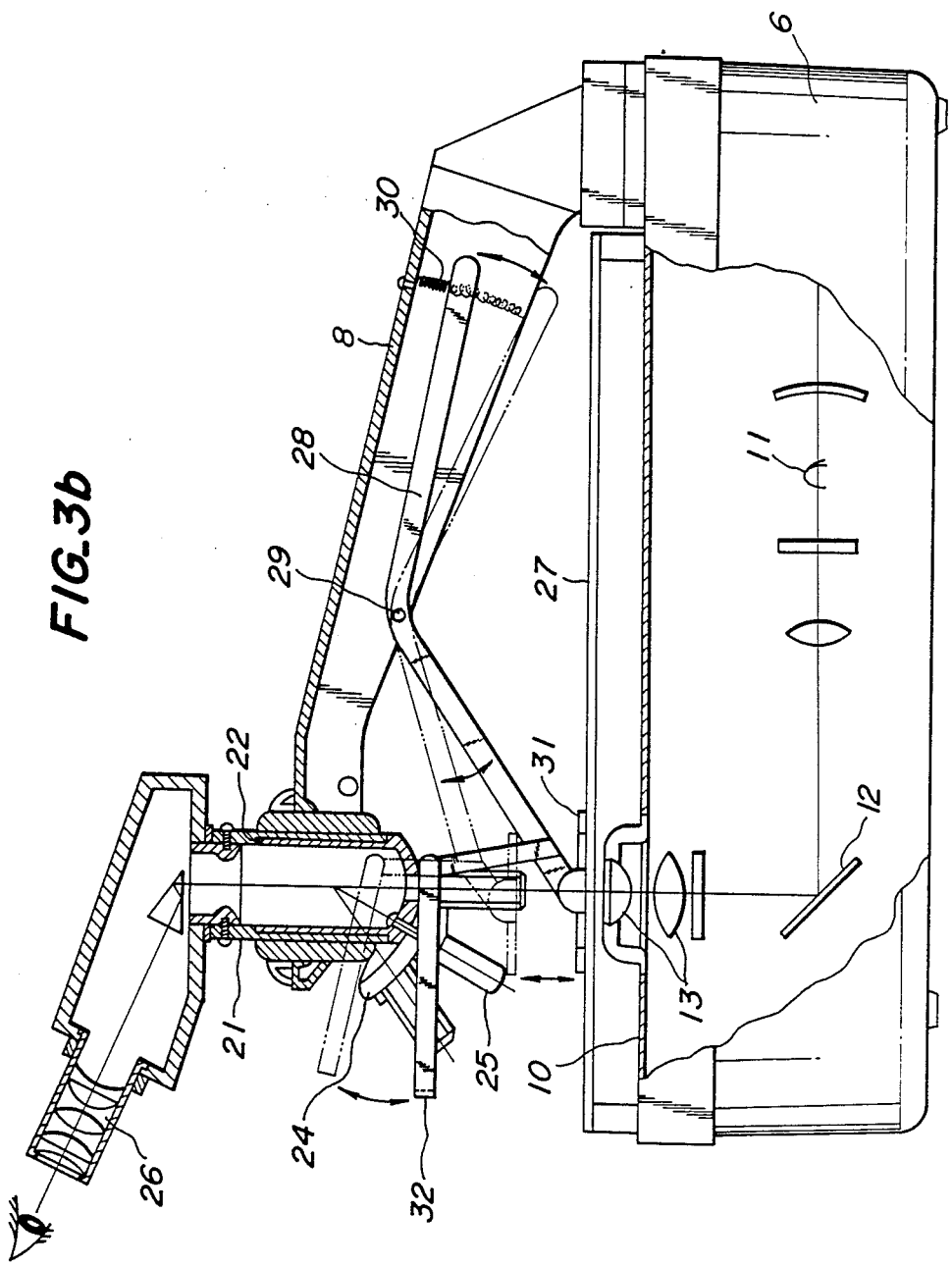

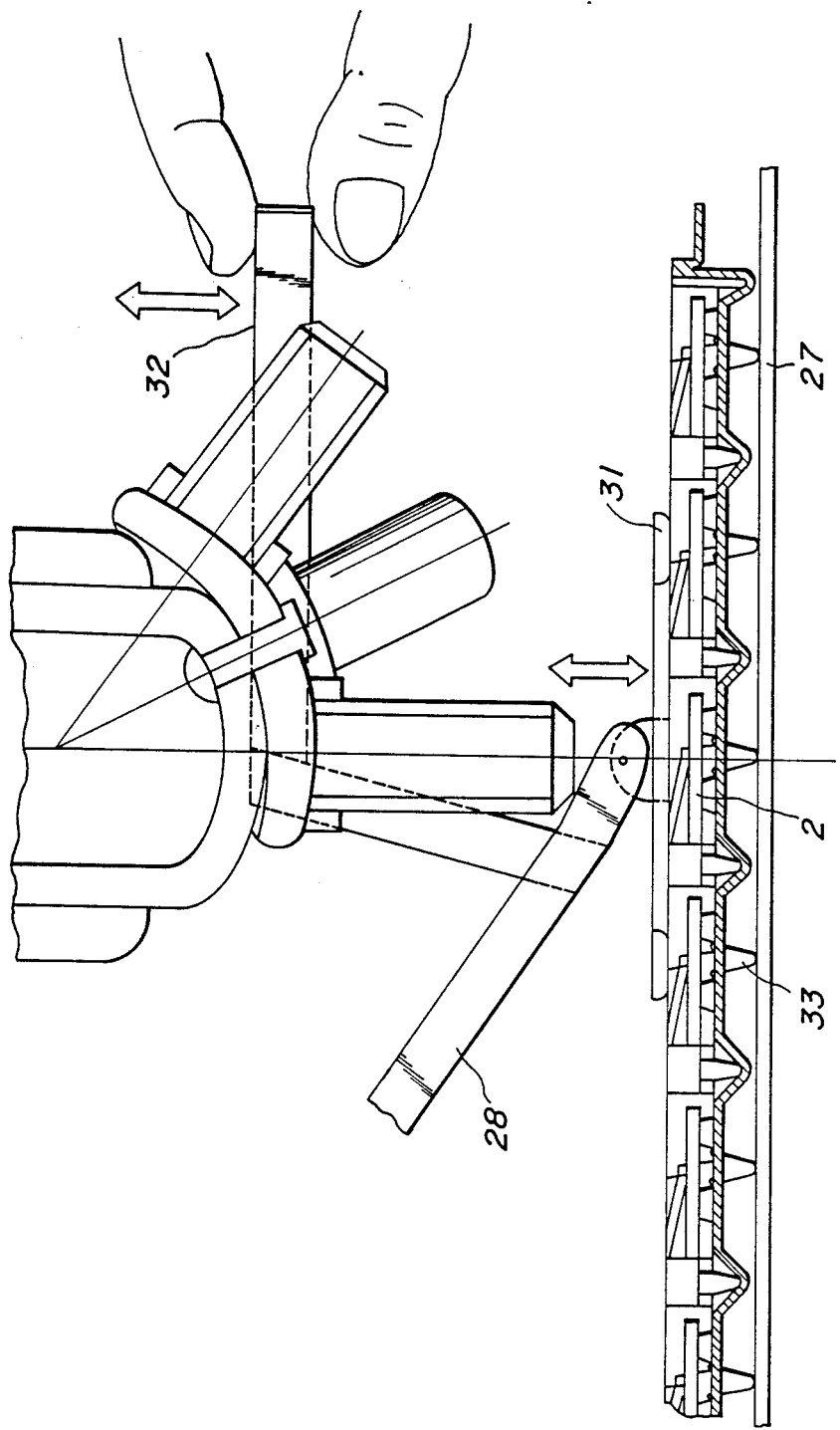

FIG_4a
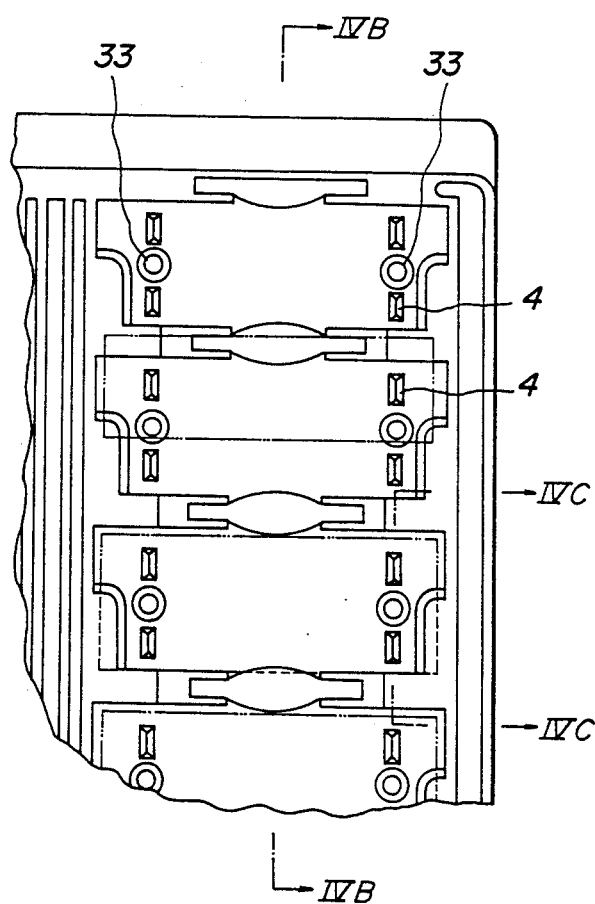
FIG_4b
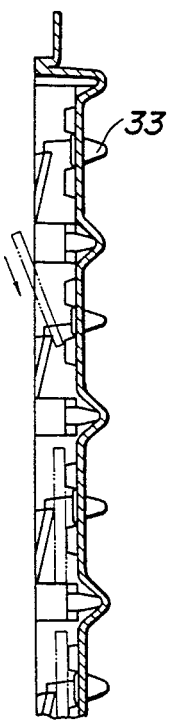
FIG_4c
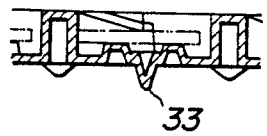
FIG_4d
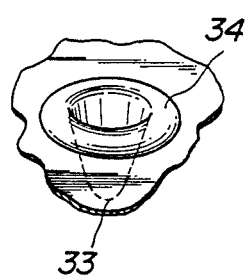

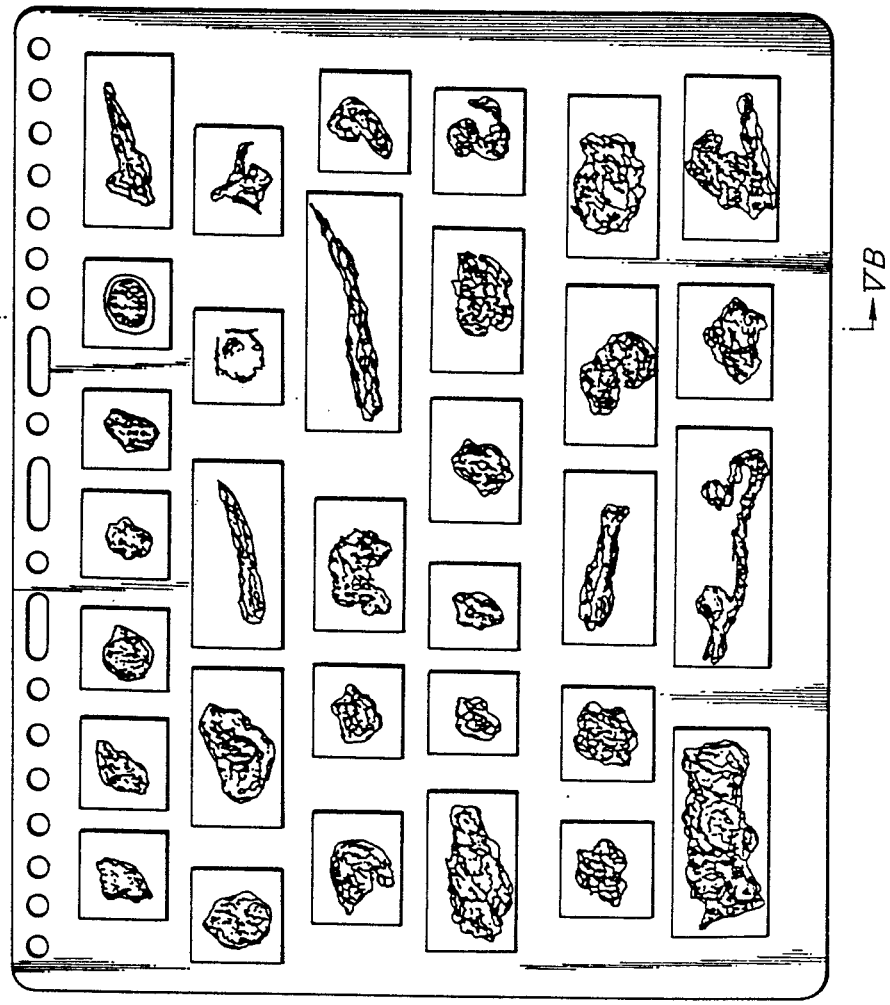
FIG_5a
FIG_5b

FIG_6c
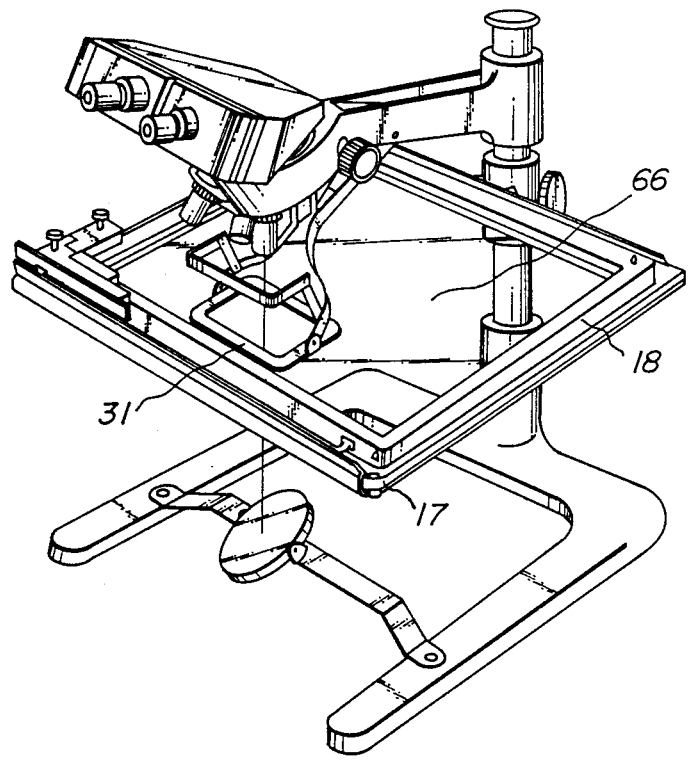

FIG_7a
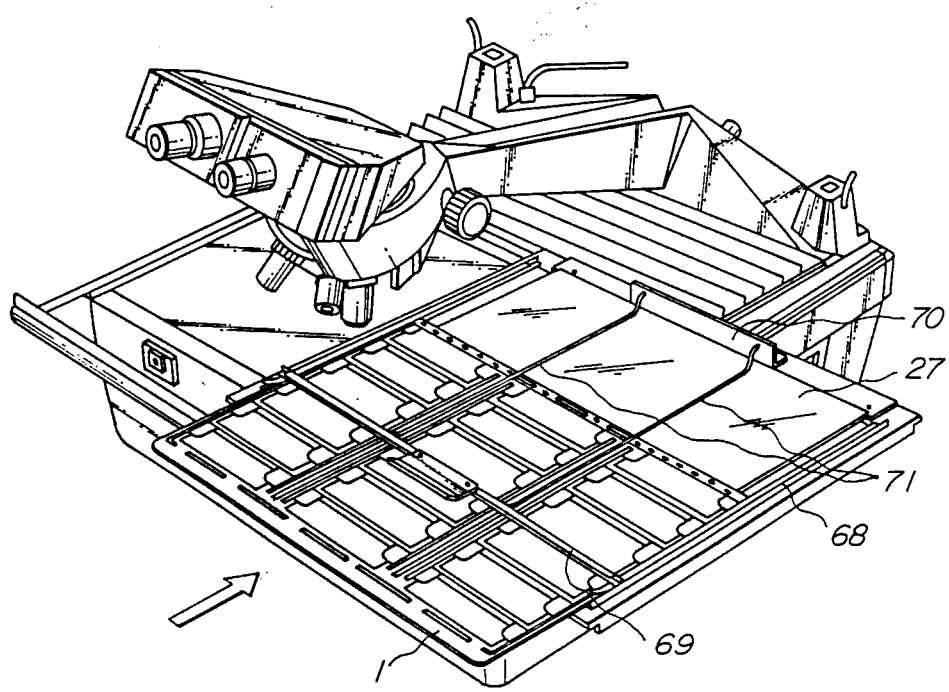

FIG_7b
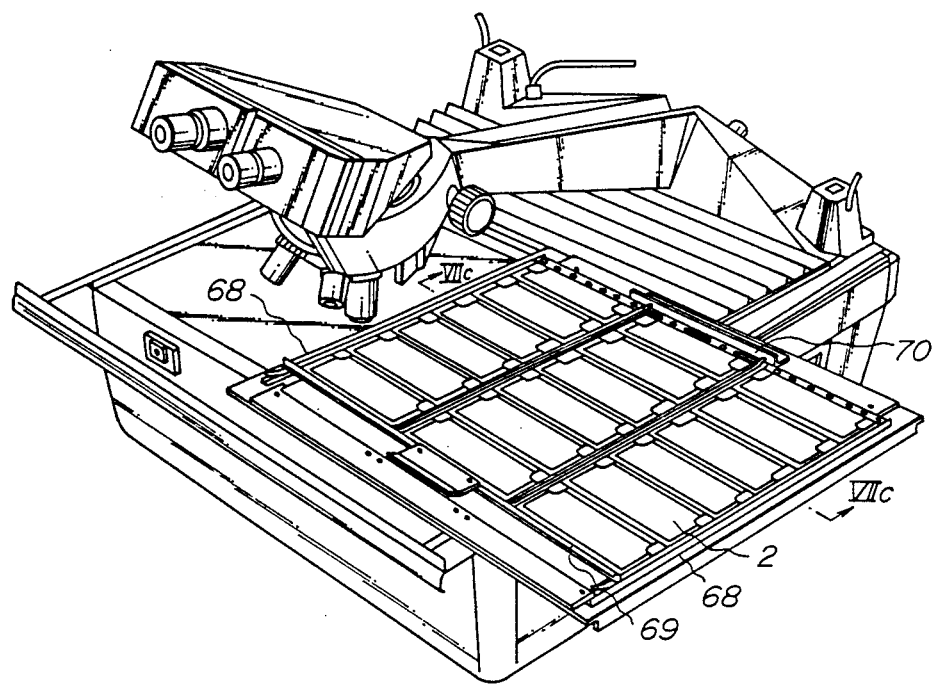

FIG_8a
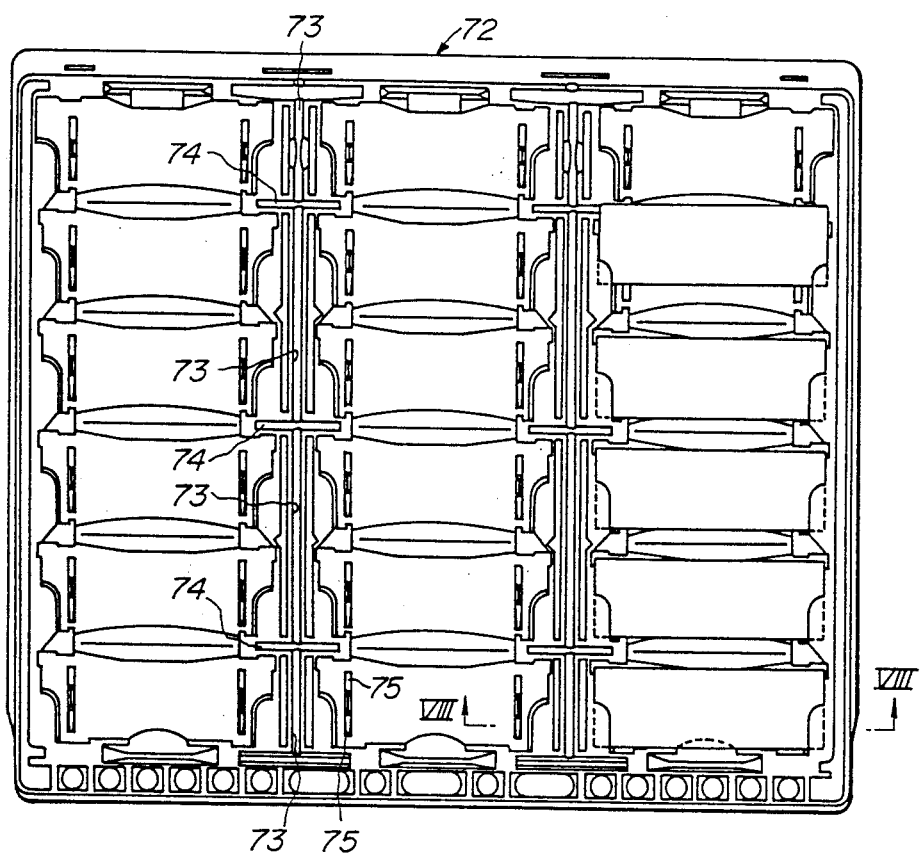
FIG_8b
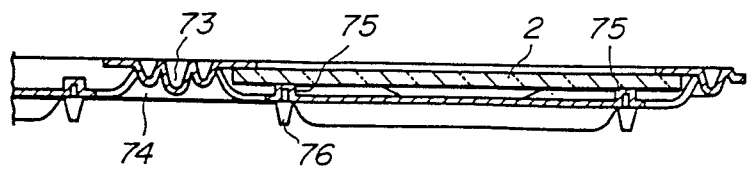

MICROSCOPE

This is a continuation-in-part application of U.S. Ser. No. 860,023 filed on May 6, 1986 which is now to be abandoned in favor of the former.

BACKGROUND OF THE INVENTION

1. Field of the Invention

The present invention relates to a microscope which allows direct microscopic observation of samples on glass plates (preparations) arranged in a file page.

2. Related Art Statement

In general, an object to be inspected is observed through a microscope after a part of an organism is cut off and attached onto a glass plate. The glass plate is prepared by coloring the attached part. However, since this sample generally uses a thin glass plate of approximately 1×3 inches as a carrier, the preparation is likely to be broken and may sometimes cut fingers.

Further, every time an observation of a sample is to be made, glass plates are carried, one at a time, to a microscope by hand, and are fixed thereto for inspection. However, such a procedure is extremely inconvenient for medical and pharmacological studies when a number of samples are to be observed.

For this reason, in order that many preparations (10, 20, etc.) may be handled as a single group of samples, it has been recently necessary to arrange and put these preparations in a specific order for quick observation.

For instance, in order that a three-dimensional state of change in tissues may be observed, it is necessary to prepare samples which have been separately cut off into several layers between an epiderm portion and an inner layer. Tens of preparations are usually necessary, and are required to be arranged and put in a specific order depending upon cut-off locations of the living body.

Moreover, for instance, when preparations prepared from different objects placed under the same conditions through cutting, are compared and examined together, that is, classified with respect to study themes in pharmacological studies, these preparations are desirably arranged and stored in a single file page together. This is required to enhance the comparison examination speed and ultimately increase study efficiency.

Based on the above requirements, recently there have been widely used a so-called "preparation file" in which preparations may be detachably arranged and stored, for example, in three columns and six rows, that is, in a total number of eighteen, on a single plastic transparent file page. Therefore, it is a current practice to take out preparations stored in the file page and place them under the microscope one by one, and return them to the file page after the observation. This is a time-consuming process, and its operation has not been simplified.

SUMMARY OF THE INVENTION

It is an object of the present invention to provide a microscope which allows direct observation of several different samples of an object to be inspected while the samples being placed in a file page so as to remove the above-mentioned inconveniences.

According to the present invention, there is a microscope which includes a base frame, a stage provided on or over the base frame which movably supports, on a plane, a plate which is adapted to locate and place a plurality of samples on the same plane. An arm extends from the base frame up to a place over the stage. A magnifying optical system has an optical axis directed in a direction orthogonal to the stage. An illuminating optical system is provided on the axis of the magnifying optical system at a place spaced from the stage.

According to the microscope of the present invention, the plate which locates and stores a plurality of samples thereon is placed on the wide stage. A sample to be observed is positioned on the same optical axis, between a magnifying optical system and an illuminating optical system, by freely moving the plate in a horizontal direction. An image of the sample is formed in the magnifying optical system at an arbitrary magnification under an appropriate light intensity through an appropriate illumination by an illuminating optical system.

These and other objects features and advantages of the present invention will be appreciated upon reading of the following description of the invention when taken in conjunction with the attached drawings. It is understood that some modifications, variations and changes of the same could be made by one skilled in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1a and 1b are a perspective view and a partially sectional side view respectively, showing an embodiment of the microscope according to the present invention, respectively;

FIGS. 2a, 2b, 2c and 2d are illustrative views showing a file page for holding slide preparations, which file page is used in connection with the microscope according to the present invention;

FIGS. 3a, 3b and 3c are illustrative views showing another embodiment of the microscope according to the present invention;

FIGS. 4a, 4b, 4c and 4d are a plane view, a sectional view and detailed views showing another embodiment of the file page, respectively;

FIGS. 5a and 5b are plane view and a sectional view showing a still another embodiment of the file page, respectively;

FIGS. 6a, 6b and 6c are perspective, side elevational and another perspective views of an embodiment where a stage is movable vertically;

FIGS. 7a, 7b and 7c are a perspective view, another perspective view, and a partially enlarged sectional view, respectively, of still another embodiment of the microscope according to the present invention which is provided with a stage base plate having a means for locating and pushing a file page on the stage; and FIGS. 8a and 8b are a plane view and a partially enlarged sectional view, respectively, of a file page advantageously applied to the microscope of FIG. 7.

DETAILED DESCRIPTION OF THE PREFERRED EMBODIMENTS

The present invention will be explained in more detail with reference to the attached drawings.

Figure 1A:
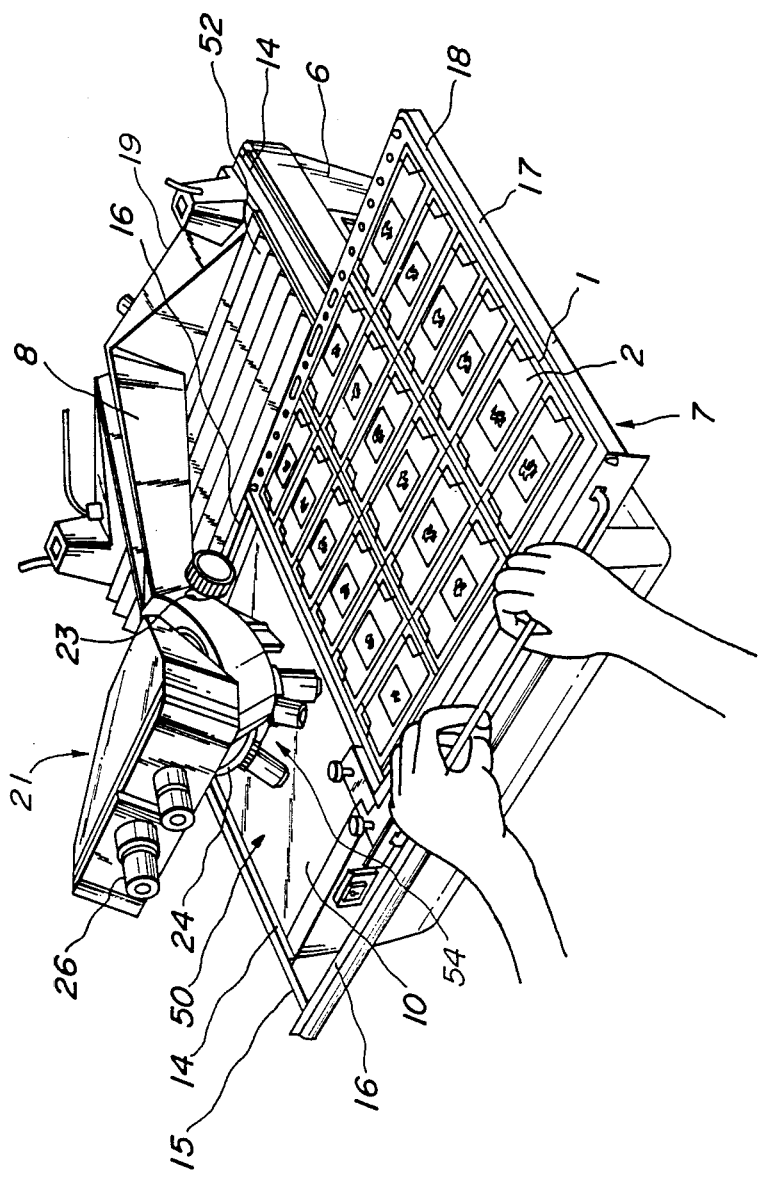

FIGS. 1a and 1b show an embodiment of the microscope according to the present invention. A preparation file page 1 for holding preparations used in connection with the microscope according to the present invention and a preparation 2, which includes a glass slide, a sample to be viewed, and a glass cover sheet are shown.

The file page 1 with the preparations 2 is placed on a stage 18 which is located on a stage base plate 17. Stage base plate 17 is located on a slide device 7 provided on a box body 6 forming a base frame of the microscope. The microscope of these figures is provided with the box body 6 having a planar upper face 50. The slide device 7 is slidably mounted on the upper face of the box body 6. Therefore, as the slide device is moved in any desired direction, the box body remains stationary. The slide device may be locked at a desired direction for microscopic viewing of a particular slide.

A support arm 8 supports an optical system of the microscope such that the operation of the slide device 7 does not interrupt the optical system. The upper face of the box body 6 is covered with a light transmitting diffusion plate 10. The plate 10 may be transparent or translucent. An appropriate light source (not shown) and an optical system (not shown) for uniformly irradiating light rays from the light source to the diffusion plate 10 are arranged inside or outside of the box body 6. The diffusion plate is uniformly illuminated from underneath by means of the light source and the optical system. An accordian-type black sheet 52 is connected to the slide device so that when the slide device is moved towards the operator, the sheet moves with the slide device to block out light from the diffusion plate 10. Sheet 52 remains stationary during lateral movement of the slide device.

The preparation file page 1 is illuminated from underneath through a cross head 15 placed on the diffusion plate 10. Thereby, a group of the preparations 2 are observed through the file page 1. The area of the diffusion plate 10 which includes the optical axis of the microscope is used for microscopic viewing of a single slide preparation. However, the remainder of the diffusion plate acts as a preview area to illuminate all the slides in the file page prior to microscopic examination. A label on each slide, and the slide itself, is thereby sufficiently illuminated to aid an operator in deciding which slide to be examined by the microscope.

As shown in FIG. 1b, according to the illustrated embodiment, the illuminating optical system includes an auxiliary condenser lens, a reflection mirror 12 and a condenser lens 13 arranged in the box body. As shown in FIG. 1b, a beam of light rays passes through an object to be inspected via a light ray path passing through the light source 11, the reflection mirror 12 and the condenser lens 13.

The slide device 7 is constructed so that a pair of cross heads 15 are engaged through roller bearings with a pair of parallel lateral rails 14, 14 provided on right and left edges on the upper face of the box body through roller bearings. A pair of transverse rails 16, 16 orthogonl to the lateral rails 14, 14 are attached to or integral with the cross heads 15. The stage base plate 17 is engaged with the transverse rails 16 through roller bearings 53 as are cross head 15 with the rails 14.

The stage 18 is located on the stage base plate 17. The stage 18 is designed to be equal or slightly larger in size than preparation file page 1, and is made of a metal framing or a glass plate. For instance, projections may be provided onto this metal framing or glass plate for engaging with holes of the file page. By such a construction, the file page 1 placed on the stage 18 is freely moved two-dimensionally (along X and Y axes) in a horizontal plane by means of two pairs of rails 14, 16 and the stage base plate 17.

As shown in Japanese utility model registration publication No. 50-6,839, locating means are provided in two pairs of the rails, the cross head and the stage base plates.

Further, the stage 18 or the stage base plate 17 may be provided with metal pieces such as L-letter shaped engaging pieces which engage with at least two of four sides or corner portions of the file page 1 to locate the latter on the stage.

Further, as shown in FIGS. 1a and 1b, an arm 8 is provided at upper face corners of the box body 6. The arm obliquely extends over the box body in an upward direction from the rigid base portion 19. The arm 8 is provided at the tip portion with an upper optical system 21 of the microscope. The optical system has a light optical axis which is coincident with the optical axis from the condenser lens 13. A lower optical system 54 is screwed to the upper optical system 21 through a rack and pinion system 23 such that the lower optical system 54 may be moved roughly or finely on the same axis as the upper optical system. The lower optical system 54 is provided with plural kinds of objective lenses 25 and an objective lens-supporting barrel 22. The objective lenses 25 include different magnifications, and are supported by a revolving nosepiece 24. A beam of the light rays incident to the objective lens changes its orientation by an optical path switch prism and is converged by an ocular lens 26. The beam is thereby led to a visual field of an observer.

The preparation file 1 is formed by molding a transparent plastic plate. Its outer profile has transverse sides of about 28 cm and lateral sides of about 28 cm. The preparation file serves as a storing instrument capable of orderly arranging the preparations 2 in a lattice pattern of three columns and six rows, that is, in a total amount of eighteen. As shown in FIG. 1a, each of the preparations is detachably inserted into one section of the file 1. Once the preparation 2 is inserted in the preparation file 1, it is kept parallel to the bottom face of the file 1.

The preparation 2 is retained in the file page 1 in a horizontal position by a pair of planar lugs 3, 3 and projections 4, 4 shown in FIGS. 2a, 2b, 2c and 2d. The lugs are made of plastic and integrally provided on the side edge portions of each section on the upper face of the file page 1. The lugs are inclined slightly downwardly to elastically press the preparation 2 in place.

Two or four projections 4 project upwardly from the bottom face in the vicinity of the planar lugs 3. A face which is inclined toward the inside of the section is provided in a wall 5 opposed to the planar lugs 3, 3 on the preparation-inserting side so as to facilitate the insertion of the preparation 2. This makes it extremely easy to insert the preparation 2 into the section of the file page and take out the preparation from the file page. After the insertion, the preparation is prevented from slipping out from the section. Even if the file page is shaken back and forth, the preparation will not slip out from the file page.

The projections 4 serve as a spacer to prevent the glass preparations 2 from being damaged due to an external impact upon the bottom face of the file page. Further, the projections form a space necessary for out-of-focusing fine dirt, etc., which is located on the bottom plate, from an image of an object to be inspected during the direct observation through the file page. Since the preparations 2 are regularly and horizontally arranged in the file page 1, the preparations are easily distinguished by holding the file page 1 to the light.

As shown in FIG. 2a, a row of binding holes are provided on one edge portion of the file page to bind the file page in an ordinary binder or the like. The binding holes are used not only for binding the file page in a binder but also for engaging with pins 77 projecting from the stage base plate 17 through stage 18 when the file page is placed as shown in FIGS. 1a, 1b, 6a and 6b. Thereby, the file page is located in place on the stage.

Next, another embodiment according to the present invention will be explained with reference to FIGS. 3a, 3b and 3c.

A microscope of this embodiment is used with the preparation file page. The microscope is employed in a case where a file page 1, made of plastics or the like, is slightly curved so that the intersection of the file page 1 with the optical axis at right angles, which is necessary for accurate microscopic observation, is not maintained.

As shown in FIGS. 3a, 3b and 3c, in order to avoid the influence of undesirable curving of the file page, a planar glass plate 27 is provided on the diffusion plate 10 of the upper face of the box body. This planar glass plate 27 is at right angles with respect to the optical axis, and the file page 1 is movably placed on the glass plate. The arm 8 is provided with a pair of angular levers 28, 28 which are rotatable at fulcrums 29. The end portion of the lever 28, on the base side of the arm, is connected to the inside of the support arm 8 through a spring 30. A mouth-like press piece331 is provided at the levers 28 under the upper optical system. The press piece 31 is finely rotatable to perform elastical pressing or releasing of the glass sheet 27 located under the press piece. Further, the lever 28 is also provided with a handle 32 near the press piece to facilitate manual pressing and releasing of the press piece 31.

The pressing mechanism with the pressing piece 31 functions to horizontally press the preparation 2 on the file page onto the glass plate 27 to make the face of the preparation orthogonal to the optical axis. The pressing mechanism also functions to focus the microscope onto an object to be inspected in the preparation 2 by adjusting the pressing force posed onto the file page 1 through the pressing piece 31 by means of the handle 32. The pressing piece utilizes the property that the file page is elastically deformable due to the properties of the plastic file page itself.

FIG. 3c shows a state in which the file page 1 is pressed against the glass plate 27 by means of the press piece 31.

As shown in FIGS. 4a to 4b, the preparation file page 1 is provided with projections 33 which project from the rear face side of the file page in a place where they do not interrupt the microscopic observation through the section. The projections 33 facilitate the vertical movement of the file page in pressing. For instance, at least two projections 33 are positioned near the respective projections 4 or therebetween.

As seen from the sectional view of FIG. 4c and the perspective view of FIG. 4d, projection 33 is constituted by a conical portion, like a volcano crater, and a swelled base portion 34, surrounding the conical portion 33 as in a somma. The thus integrally provided projection 33 functions to make the pressing pressure applied to its tip end extremely uniformly absorbed by the base portion. Thereby, the deflection due to the pressing is not propagated to the whole file so that an intended section may be uniformly pressed down.

Therefore, the preparation 2 positioned within the press piece 31 is lowered by means of the projections 33 of the file page and the mouth-like press piece 31 while its posture is maintained at right angles with respect to the optical axis.

Further, when the objective lens is brought near to the preparation during ordinary microscopic observation, there has been a possibility that the glass preparation is broken by the tip end of the objective lens. When the preparation is inerted into the file page 1, even if the tip end of the objective lens 25 touches the preparation, the preparation is advantageously prevented from being broken due to the elasticity of the file page itself and the function of the above-mentioned projections.

Although the microscope according to the present invention has been explained on the basis of the embodiments used in connection with the two kinds of the preparation file pages, the microscope according to the present invention can be applied not only to the glass preparations as shown, but also to a recently popular large scale plastic plate 35 shown in FIGS. 5a and 5b onto which a number of objects to be inspected are directly attached.

According to the illustrated embodiments, although the stage is fixed and the optical system is vertically moved, the box may be provided with a moving mechanism for vertically moving the stage as in the case of the ordinary microscopes. This is shown in FIGS. 6a, 6b and 6c.

Figure 6A:
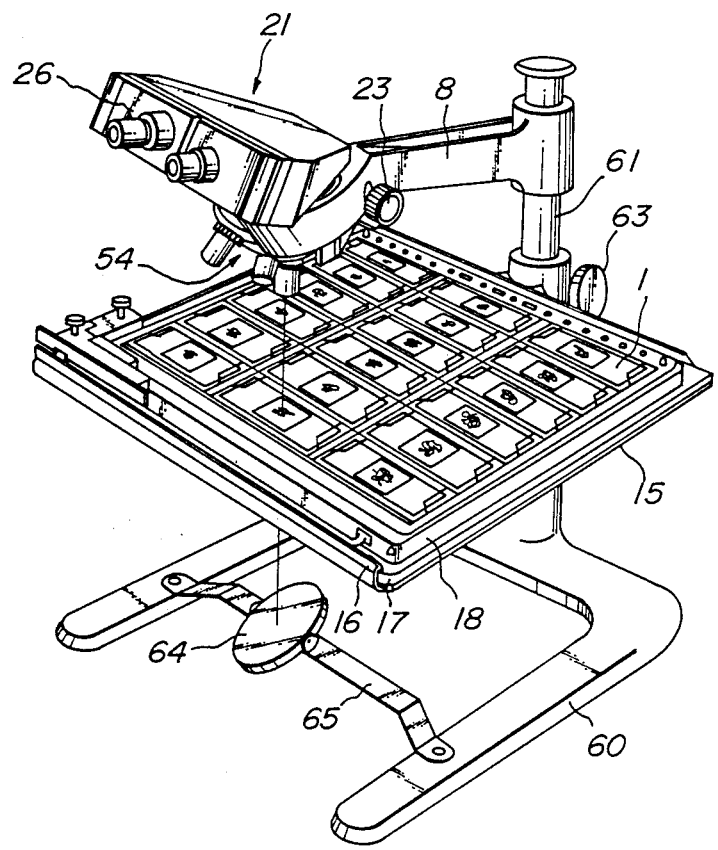
Figure 6B:
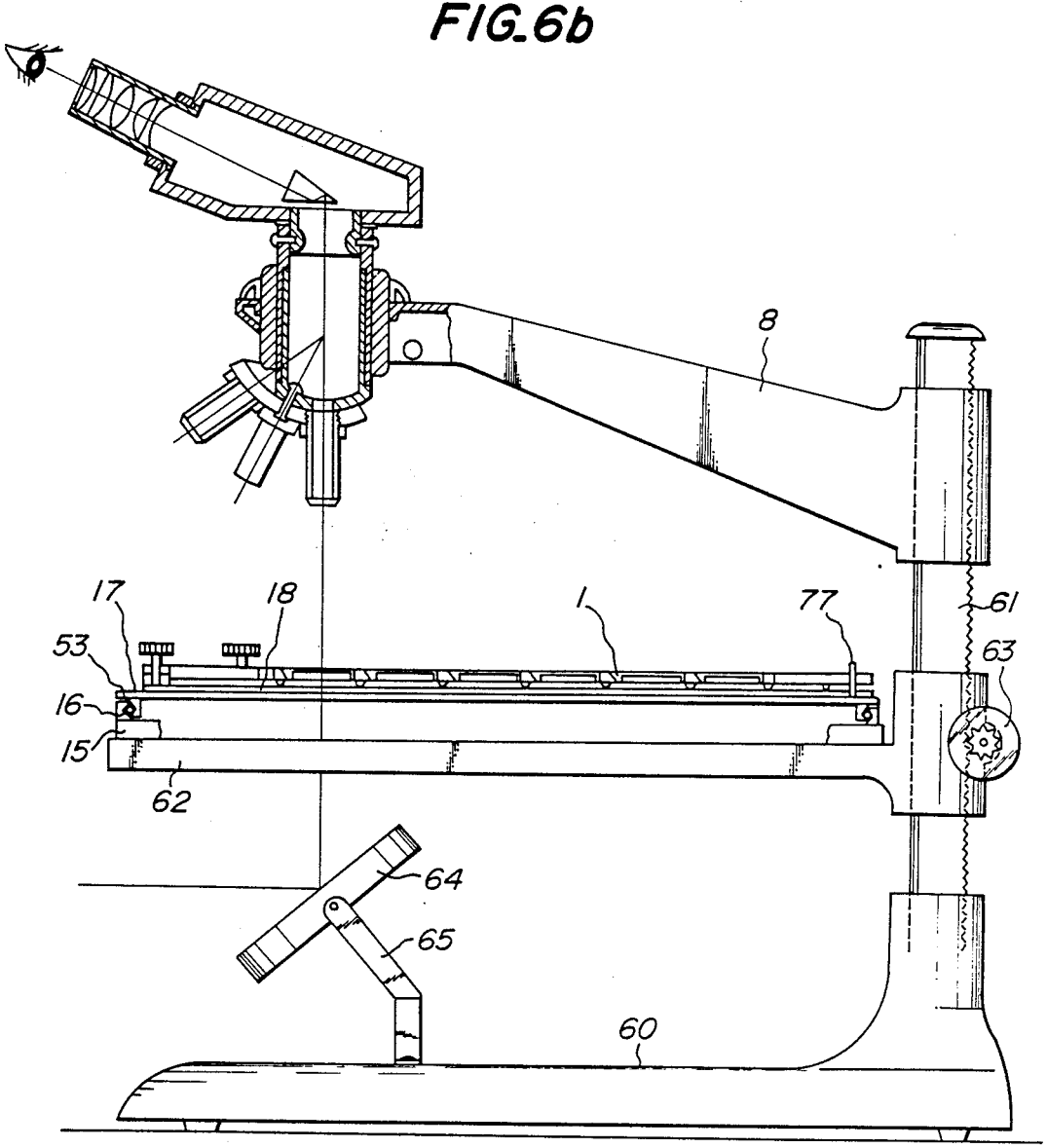

FIGS. 6a and 6b show another embodiment of the microscope of the present invention in a perspective view and a side view, respectively. In this embodiment, a table 62 as a base frame is vertically movably attached, by means of a rack and a pinion, to a pole 61 supported and erected on a leg portion 60. This table 62 supports a stage 18. The movement of the rack and the pinion is controlled by a rough movement handle 63. Above the table 62, an upper optical system 21 and a lower optical system 54 are attached to the pole 61 through the support arm 8. A reflection mirror 64 is attached to the leg 60, and is rotatably supported by two brackets 65 attached to a bifurcated portion of the leg 60.

A light transmitting diffusion plate having substantially the same dimension as the file page to be placed on the table 62 is inserted into middle portion of the table 62. A hole not shown is provided in the light transmitting diffusion plate at a place around an intersection between the diffusion plate and the optical axis of the optical system. This hole has a size substantially equal to an image-holding area of a preparation 2. As explained in the foregoing embodiments, the microscope of FIGS. 6a and 6b is provided with a sliding device which is constituted by fitting a pair of cross heads 15 to lateral rails not shown. A stage base plate 17 is slidably fitted to a pair of transverse rails 16 provided on the cross heads 15. A stage 18 is fixed on the stage base plate 17. As in the same with the embodiment in FIG. 1, direct microscopic observation is made with respect to the file page 1 into which preparations 2 are inserted.

In the modified embodiment, since the optical system can be vertically finely moved and the stage can be vertically roughly moved, there is an advantage that the focusing of the microscope can be easily performed.

Further, as one example of the present invention, there have been shown the embodiment in which the base frame is designed in a box body, that is, a substantially sealed type microscope. In these embodiments, an illuminating optical system containing an electric-light bulb (not shown) or fluorescent light (not shown) is housed in the box body, but the base frame may be designed as an open type frame with only a reflector mirror as the illuminating optical system, as shown in FIGS. 6a, 6b and 6c. In this case, natural light rays or an external light source is used as in the case of commonly known microscopes.

Further, as in the case of the embodiment shown in FIGS. 3a through 3c, the microscope perspectively shown in FIG. 6c as a modified embodiment is provided with a pushing mechanism having a pushing piece 31 for finely adjusting the focusing operation. This pushing mechanism functions to push a preparation to a transparent glass plate 66 fitted and fixed into a stage 18 so that the surface of the preparation may be orthogonal to an optical axis of an optical system. In this embodiment, no light transmitting diffusion plate is inserted into the table 62.

Another microscope as a still further modified embodiment is shown in a perspective views in FIGS. 7a and 7b. This microscope has a pushing and locating means which is provided on a stage base plate and functions in cooperation with holes 67 of the preparation file page 1 shown in FIG. 2a.

More specifically, the stage base plate is provided with a guide frame members 68 which engage with side edge portions of the file page 1 and bring the rear surface of the file page into an intimate contact with the planar glass plate 27. A rod member 69 is stretched between the opposite guide members 68 on the rear side as viewed from a file page-inserting direction. A projection 70 is provided on the stage base plate 17 on the front end as viewed from the file page-inserting direction, and the file page contacts it. Spring wires 71 are stretched between the rod member 69 and the projection 70, and are adapted to be fitted into the respective channels 67 of the file page 1. The spring wire is stretched such that it may fall slightly toward the planar glass plate 27.

Figure 7C:
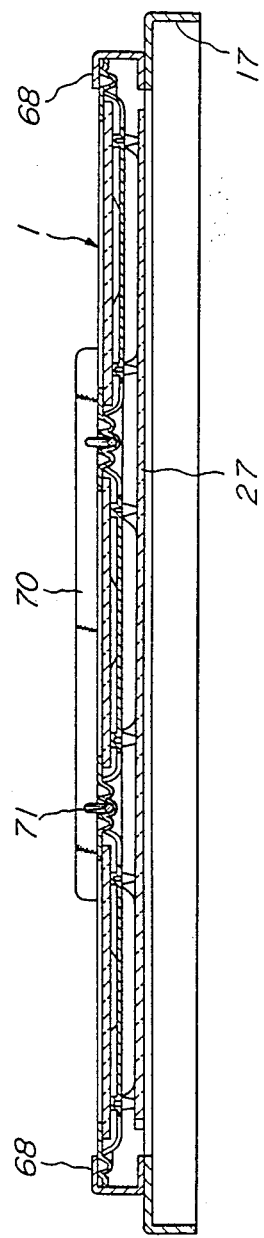

By so constructing, the microscope in this embodiment, when the file page is pushed in the inserting direction as shown in FIG. 7a, it is guided by the guide frame members 68 on the opposite sides and slided relative to the spring wires 71 fitted into the channels 67 of the file page. Ultimately, the file page is moved on the planar glass plate up to a position where it contacts with the projection 70 provided on the stage base plate 17, and is located and stored. The state in which the file page is located and held in this way is shown in FIGS. 7b and 7c. In such a state, the file page 1 is pushed to the planar glass plate 27 by a push force of the spring wires 71 fitted into the channels 67. Thus, even if the file page is curved, the file page can be always maintained in a horizontal posture relative to the planar glass plate 27. Accordingly, a plurality of the preparations inserted and arrayed in the file page are arranged in parallel with the planar glass plate 27 without any vertical level. The spring wires 71 fitted into the channels 67 of the file page 1 are located lower than at least a surface of a sample on the preparation to be examined in a place where the microscope is scanned relative to the preparation, and an amount by which the file page 1 projects upwardly from the preparation 2 is very small. Therefore, the file page 1 is movable to a desired location without interferring with the objective lens of the microscope.

The file page 72 favorably used in the microscope shown in FIGS. 7a and 7b will be explained with reference to FIGS. 8a and 8b in a plane view and a sectional view, respectively. The file page 72 has a continuous channels 73 similar to those of the file page shown in FIGS. 2a and 2b, and it further comprises auxiliary ribs 74 projecting on the rear surface side of the file page 72, projections 75 and 75 projecting from the front surface of the file page 72 for supporting preparations, and support legs 76 projecting from the rear surface between the projections 75 for supporting the file page 72. The auxiliary ribs 74 function to prevent accidental bending of the file page 72 when the preparation is inserted into the file page 72. The support legs 76 function to uniformly contact with the planar glass plate 27 when the spring wires 71 of the microscope are fitted into the channels 73 of the file page 72, so that they support the file page 72, in its turn all the preparations 2, within the same plane and substantially in parallel with the planar glass plate 27.

In the above, explanation has been made of a case where the file page is applied to the microscope of the present invention and samples on the preparations 2 are systematically observed. When microscopic observation is to be made while light is downwardly irradiated upon an object to be observed and is reflected by the object, it is possible to observe surfaces of opaque materials such as IC tips, metallic tissue pieces, etc.

The microscope of the present invention has the advantages that a stage is provided to place the preparation file page thereon. Direct microscopic observation of the objects to be inspected in the preparations placed on the stage is done through the file page to make the observing operation easy. Since the preparations are observed while being inserted into the file page made of the elastic material, the preparations are prevented from being broken even when brought into contact with the objective lens of the microscope.

What is claimed is:

1. A microscope comprising:
a base frame including a planar plate,
illumination means for irradiating said planar plate,
a stage mounted on said base frame,
a file page having a plurality of rows and columns, said file page being located on said stage and adapted for supporting a plurality of preparations on a common plane,
an arm extending from said base frame above said stage,
magnifying optical means mounted on said arm and including an optical axis directed perpendicular to said stage for viewing of said plurality of samples, and
retaining means for retaining said file page on said stage and for preventing curvature of said page, said retaining means including guide frame members for engaging two opposite side edge portions of said file page, a rod member interconnecting said guide frame members, a projection extending from said base frame to engage a front edge of said file page and means biased toward said planar plate and extending between said rod member and said projection and spaced to engage channels of said file page located between adjacent columns for pushing said file page to said planar plate, and
said stage being movably mounted on said base frame for movement in the lateral and longitudinal directions so as to view preparations supported by said file page retained on said stage by said retaining means.

2. A microscope as claimed in claim 1, wherein the stage is movable along the optical axis and in a direction orthogonal to the optical axis.

3. A microscope as claimed in claim 2, wherein said illumination means includes a reflecting mirror.

4. A microscope as claimed in claim 1, wherein said stage is movably mounted on said base frame for lateral movement relative to said base frame.

5. A microscope as claimed in claim 4, wherein first rails are mounted on said base frame, cross heads are fitted to said first rails, second rails are mounted on said cross heads in a direction perpendicular to said first rails, and said stage is fitted onto said second rails for horizontal movement of said stage.

6. A microscope as claimed in claim 1, wherein said retaining means includes a positioning pin upwardly secured on the corner of said stage so as to view a plurality of each preparation supported by said file page in storage.

7. A microscope as claimed in claim 1, wherein first rails are mounted on said base frame, cross heads are fitted to said first rails, second rails are mounted on said cross heads in a direction perpendicular to said first rails, and said stage is fitted onto said second rails so as to move said stage horizontally in a lateral and longitudinal direction relative to said first and second rails.

8. A microscope as claimed in claim 1, wherein said stage is movable along the optical axis and in a direction orthogonal to the optical axis.

9. A microscope as claimed in claim 1, wherein said illumination means is a reflecting mirror.

10. A microscope comprising:
a base frame,
a light transmissive diffusion plate mounted on said base frame,
a stage movably mounted on said base frame above said diffusion plate,
a file page located on said stage by means of a pin projecting from said stage and adapted for supporting a plurality of preparations in a common plane, said preparations being attached with samples,
an arm extending from said base frame above said stage,
magnifying optical means mounted on said arm above said stage, said magnifying optical means including an optical axis directed perpendicular to said stage,
illuminating optical means for directing a source of light along said optical axis, said optical axis passing through said diffusion plate, said stage, the sample supported by said file page and ultimately to said magnifying optical means for magnified viewing of the sample,
first rails mounted on said base frame,
cross heads fitted to said first rails,
second rails mounted on said cross heads in a direction perpendicular to said first rails, said stage being fitted onto said second rails for horizontal movement of said stage,
guide members provided on said stage at the same locations as opposite side edges of said file page mounted on said stage,
a member for pushing the file page and said stage,
a pair of annular levers each pivotably mounted on opposite sides of said arm, and
a press piece rotatably mounted at one end of said pair of levers, an opposite end of said pair of levers being biased downwardly away from said arm to force said one end of said pair of levers away from said stage, said levers being urged relative to said stage to elastically press and release a sample onto and from said stage so that the sample is observed through said magnifying optical means.

11. A microscope as claimed in claim 10, wherein said illuminating optical means illuminates said plate and thereby illuminates any samples located on said stage.

12. A microscope as claimed in claim 10, wherein said stage is movable along said optical axis and movable transverse to the optical axis.

13. A microscope as claimed in claim 10, wherein said illuminating optical means includes a mirror.

14. A microscope as claimed in claim 10, wherein said stage is movable to align with said optical axis, each of a plurality of samples dispersed across said stage.

15. A microscope comprising:
a base frame,
a stage mounted on said base frame,
a file page placed on said stage and adapted for supporting a plurality of preparations in a common plane, said preparations being attached with samples,
an arm extending from said base frame above said stage,
magnifying optical means mounted on said arm and including an optical axis directed perpendicular to said stage for viewing of said plurality of samples,
a pair of angular levers each pivotably mounted on opposite sides of said arm, and
a press piece rotatably mounted at one end of said pair of levers, an opposite end of said pair of levers being biased downwardly away from said arm to force said one end of said pair of levers away from said stage, said levers being urged relative to said stage to elastically press and release a sample onto and from said stage so that the sample is observed through said magnifying optical means.

* * * * *